J. A. & H. A. House,
Belt Tightener,
Nº 39,015. Patented June 23, 1863.
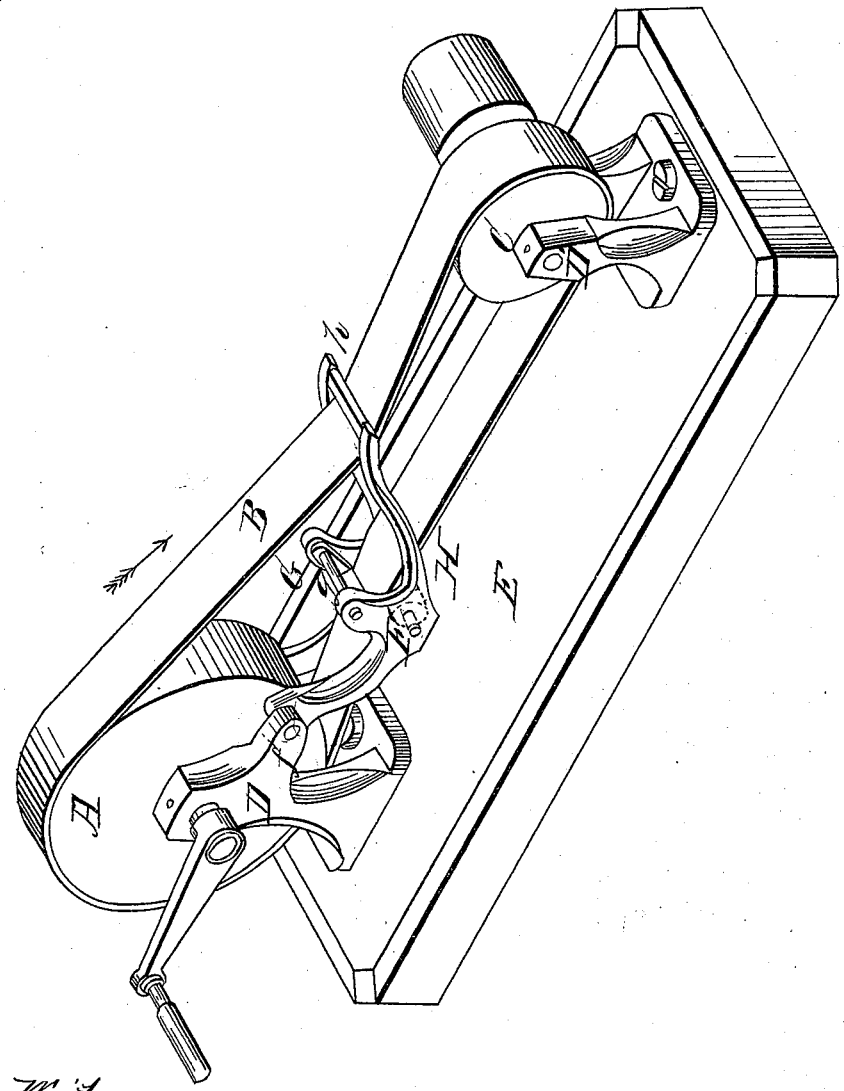

UNITED STATES PATENT OFFICE.

JAMES A. HOUSE AND HENRY A. HOUSE, OF BROOKLYN, NEW YORK, ASSIGNORS TO THEMSELVES AND AUGUSTUS G. SEAMAN, OF SAME PLACE.

IMPROVEMENT IN BELT-TIGHTENERS.

Specification forming part of Letters Patent No. 39,015, dated June 23, 1863.

*To all whom it may concern:*

Be it known that we, JAMES A. HOUSE and HENRY A. HOUSE, both of the city of Brooklyn, in the county of Kings and State of New York, have invented certain new and useful Improvements in Controlling the Movements of Driving-Belts, of which the following is a full, clear, and exact description, reference being had to the accompanying drawing, which makes part of this specification, and in which a perspective view is given of one modification of the improvement applied to a belt driving a main or line shaft.

The object of our invention is to add friction to the belt the moment any strain comes upon the driving-pulley, and to release the friction on the belt when the driving-pulley stops, while at the same time the application of a brake prevents the possibility of running the belt backward; and to this end our invention consists in the employment of a lever suitably pivoted at one end, and having a rigid bar at its opposite end resting on the portion of the driving-belt passing from the top of the driving-pulley to the top of the one driven, while at a proper distance from its pivoted end this lever carries a friction-roller, so placed as to be above, or that its upper perimeter shall be above, a straight line passing from the lower edge of the driving to the lower edge of the pulley that is driven; and our invention further consists in combining with the lever which controls the friction on the belt a brake which, the moment the driving-wheel receives a reverse motion, falls on the belt above the friction-pulley, so as to clamp it immovably, and thus prevent all reverse or any backward motion of the belt.

In the accompanying drawings, A represents the driving-pulley; B, the driving-belt, moving in the direction indicated by the red arrow, and C, the pulley driven, attached to its shaft. These parts may be sustained horizontally in any desired position on the main frame in brackets, as in the drawing or otherwise.

The brackets D and D' in the drawing are attached to a main frame or bar, E, which supports them and the pulleys in a horizontal position. From the arms of bracket D projections *f* extend a short distance toward the pulley to be driven, and to these projections are attached by pins or hinges the two arms of lever F, which are united by a rod, *g*, and bar *h*, the latter resting on the top of the upper portion of the belt B and the former serving also to carry the brake G nearly perpendicularly, below which the friction-pulley H (shown in dotted lines) is supported by the lever F. The brake is arranged so as to be some distance from the pulley—less than the thickness of the belt. It will thus be perceived that the driving-belt is bent from a straight direction by the friction-pulley H below, and by the bar *h* on the same lever that carries the pulley above.

The operation is obvious: As soon as power is applied to the driving-pulley, so as to cause the belt to move in the direction of the arrow, the belt feels the strain and tends to depress the friction-pulley, which draws down the bar on the end of the lever, and a proper friction is at once established; but when the driving-pulley is turned in the opposite direction the brake drops on the belt above the friction-pulley and clamps it immovably, while the strain on the belt is released and the driving-pulley allowed to turn freely without moving the belt.

It is obvious that our improvement, while applicable to many other descriptions of mechanism, is peculiarly well adapted to sewing-machines, for in such mechanism ease and lightness of movement are important, and it is also desirable to prevent a reverse motion, which breaks the threads or needles.

What we claim as our invention, and desire to secure by Letters Patent, is—

1. The lever F, constructed substantially as described, for the purpose set forth.
2. The combination of the lever F with the brake G, substantially in the manner described, for the purpose of stopping the belt when its motion is reversed.

In testimony whereof we have hereunto subscribed our names.

JAMES A. HOUSE.
HENRY A. HOUSE.

Witnesses:
GEO. C. BISHOP,
GEO. H. DIMOND.